United States Patent
Nomura

(10) Patent No.: US 11,933,631 B2
(45) Date of Patent: Mar. 19, 2024

(54) MAP GENERATION DEVICE AND MAP GENERATION PROGRAM

(71) Applicant: DENSO CORPORATION, Kariya (JP)

(72) Inventor: Toshio Nomura, Kariya (JP)

(73) Assignee: DENSO CORPORATION, Kariya (JP)

( * ) Notice: Subject to any disclaimer, the term of this patent is extended or adjusted under 35 U.S.C. 154(b) by 379 days.

(21) Appl. No.: 17/186,939

(22) Filed: Feb. 26, 2021

(65) Prior Publication Data

US 2021/0180983 A1 Jun. 17, 2021

Related U.S. Application Data

(63) Continuation of application No. PCT/JP2019/032845, filed on Aug. 22, 2019.

(30) Foreign Application Priority Data

Aug. 31, 2018 (JP) .................................. 2018-163074

(51) Int. Cl.
*G01C 21/00* (2006.01)
*G06K 9/00* (2022.01)
*G06V 20/56* (2022.01)

(52) U.S. Cl.
CPC ..... *G01C 21/3841* (2020.08); *G01C 21/3867* (2020.08); *G06V 20/588* (2022.01)

(58) Field of Classification Search
CPC ............ G01C 21/3841; G01C 21/3867; G01C 21/3819; G06V 20/588; G08G 1/00; G08G 1/01; G09B 29/00
See application file for complete search history.

(56) References Cited

FOREIGN PATENT DOCUMENTS

| JP | 2016133605 A | * | 7/2016 | |
| JP | 6302848 B2 | | 3/2018 | |
| WO | WO-2014199873 A1 | * | 12/2014 | ............. G01C 21/32 |

* cited by examiner

*Primary Examiner* — Nga X Nguyen
(74) *Attorney, Agent, or Firm* — MASCHOFF BRENNAN

(57) ABSTRACT

A server includes a probe data acquiring unit acquiring a probe data item of each of vehicles traveling on a road, the probe data items include, as shape point sequences, sequences of shape points of marking lines; a grouping unit categorizing shape point sequences of marking lines into plural groups for the respective vehicles, each group including one or more shape point sequences for a corresponding one of the vehicles; a center point sequence generating unit generating, based on the one or more shape point sequences included in each group, a center point sequence for each marking line to thereby remove, from the shape point sequences of the marking lines, information which is dependent on traveling states of the vehicles; and a map data generating unit identifying the center point sequence for each marking line as a corresponding marking line on a map to thereby generate map data.

7 Claims, 10 Drawing Sheets

SHAPE POINT — MARKING LINE

MAP GENERATION DEVICE AND MAP GENERATION PROGRAM

CROSS-REFERENCE TO RELATED APPLICATION

The present application is a continuation application of International Application No. PCT/JP2019/032845, filed on Aug. 22, 2019, which claims priority to Japanese Patent Application No. 2018-163074, filed on Aug. 31, 2018. The contents of these applications are incorporated herein by reference in their entirety.

BACKGROUND

Technical Field

The present disclosure relates to a map generation device and a map generation program.

Background Art

A map generation device which acquires probe data from a vehicle and generates a map using the acquired probe data is provided. For example, a method for estimating a shape of a new road using probe data is disclosed.

SUMMARY

In the present disclosure, provided is a map generation device as the following. The map generation device includes a grouping unit categorizing the shape point sequences of the marking lines into plural groups for the respective vehicles, each of the groups including one or more shape point sequences for a corresponding one of the vehicle, a center point sequence generating unit generating, based on the one or more shape point sequences included in each group, a center point sequence for each marking line to thereby remove, from the shape point sequences of the marking lines, information which is dependent on traveling states of the vehicles, and a map data generating unit identifies the center point sequence for each marking line as a corresponding marking line on a map to thereby generate map data.

BRIEF DESCRIPTION OF THE DRAWINGS

The above objects, features and advantages of the present disclosure will become clearer from the following detailed description with reference to the accompanying drawings, in which.

DETAILED DESCRIPTION OF THE PREFERRED EMBODIMENTS

[PTL 1] JP 6302848 B

In a case where a map is generated using probe data, the probe data includes information which is dependent on a traveling state of a vehicle, and this information which is dependent on the traveling states of the vehicles may be reflected in the map. In other words, driving habits, or the like, of an individual affect a point sequence of a travel trace, and thus, biased information is reflected in the map. Further, accuracy differs between during high-speed traveling and during low-speed traveling, for example, due to an interval of points of the travel trace becoming relatively longer during high-speed traveling, while an interval of points of the travel trace becomes shorter during low-speed traveling. In view of such circumstances, a method for generating a map with high accuracy which is not dependent on a traveling state of a vehicle is desired.

The present disclosure is directed to appropriately generating a map with high accuracy which is not dependent on a traveling state of a vehicle.

According to one aspect of the present disclosure, a probe data acquiring unit acquires a probe data item of each of vehicles traveling on a road generated based on image data captured by a camera mounted to the corresponding vehicle, the probe data items acquired from the vehicles include, as shape point sequences, sequences of shape points of marking lines on the road. A grouping unit categorizes the shape point sequences of the marking lines into plural groups for the respective vehicles, each of the groups including one or more shape point sequences for a corresponding one of the vehicle. A center point sequence generating unit generates, based on the one or more shape point sequences included in each group, a center point sequence for each marking line to thereby remove, from the shape point sequences of the marking lines, information which is dependent on traveling states of the vehicles. A map data generating unit identifies the center point sequence for each marking line as a corresponding marking line on a map to thereby generate map data.

The shape point sequences of the marking lines are categorized into plural groups for the respective vehicles, a center point sequence is generated for each marking line to thereby remove, from the shape point sequences of the marking lines, information which is dependent on traveling states of the vehicles, and the center point sequence for each marking line is identified as a corresponding marking line on a map to thereby generate map data. It is possible to generate map data in which information which is dependent on a traveling state of a vehicle is removed by removing information which is dependent on a traveling state of a vehicle during a process of generating a center point sequence for each marking line. By this means, it is possible to appropriately generate a map with high accuracy which is not dependent on a traveling state of a vehicle.

Figure 1:
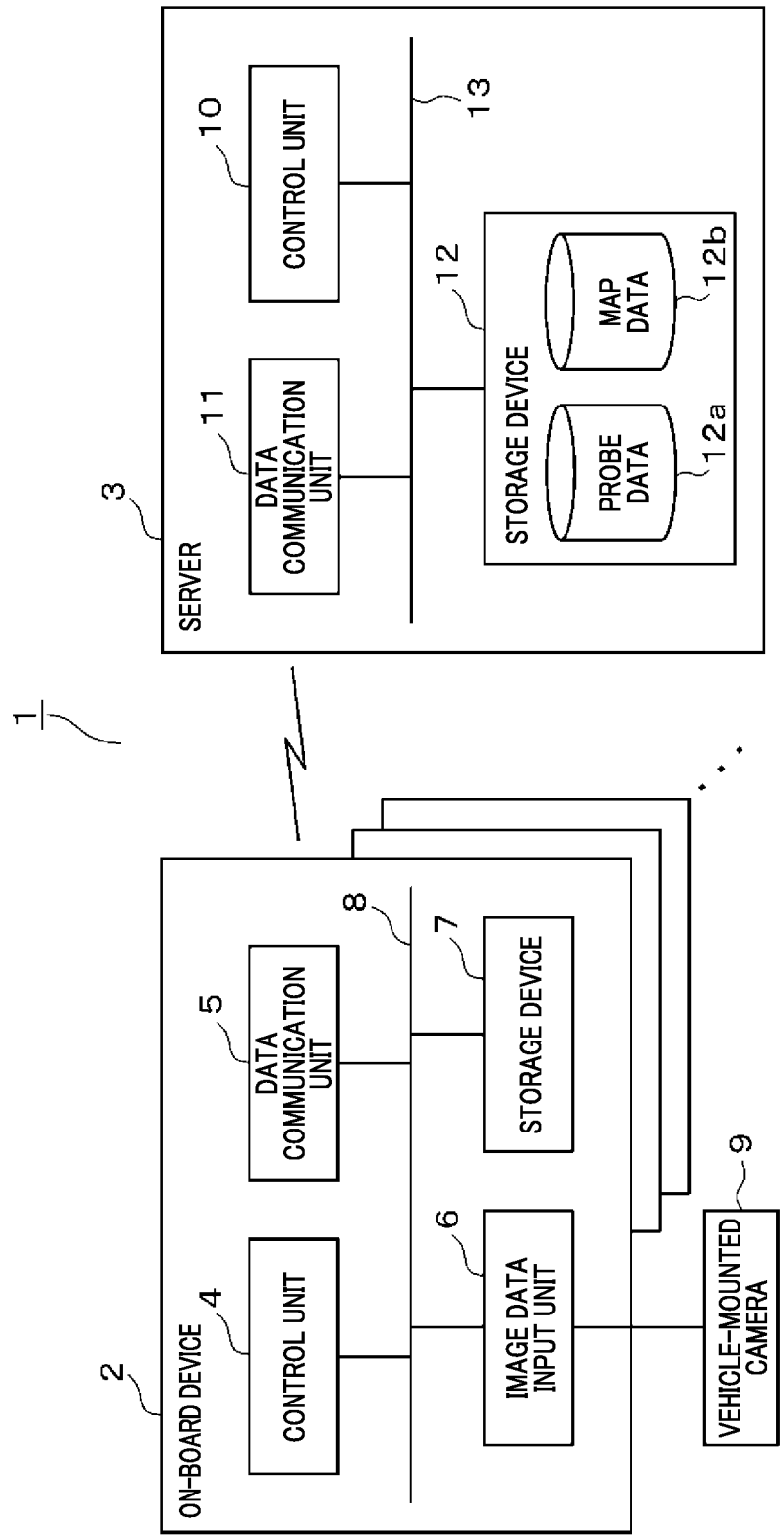
FIG. 1 is a functional block diagram illustrating an overall configuration of a map generation system in an embodiment.

An embodiment will be described below with reference to the drawings. As illustrated in FIG. 1, a map generation system 1 includes an on-board device 2 mounted on a vehicle side, and a server 3 (map generation device) disposed on a network side so that the on-board device 2 and the server 3 can perform data communication with each other. The on-board device 2 has a many-to-one relationship with the server 3, and the server 3 can perform data communication with a plurality of on-board devices 2.

The on-board device 2 includes a control unit 4, a data communication unit 5, an image data input unit 6, and a storage device 7 and respective functional blocks can perform data communication with each other via an internal bus 8. The control unit 4 includes a microcomputer including a central processing unit (CPU), a read only memory (ROM), a random access memory (RAM) and an input/output (I/O) unit. The microcomputer, which executes a computer program stored in a non-transitory tangible storage medium to thereby execute processing corresponding to the computer program, controls the operation of the on-board device 2.

The data communication unit 5 controls data communication with the server 3. A vehicle-mounted camera 9, which is provided separately from the on-board device 2, captures an image ahead of the vehicle, and outputs the captured image data to the on-board device 2. Image data is input to the image data input unit 6 receives from the vehicle-mounted camera 9 and the image data input unit 6 receives outputs the input image data to the control unit 4. The control unit 4 causes data including a vehicle position which is measured using a GPS signal received with a global positioning system (GPS) receiver, time at which the vehicle position is measured and the image data input from the vehicle-mounted camera 9 to be regularly stored in the storage device 7 as probe data.

Figure 2:
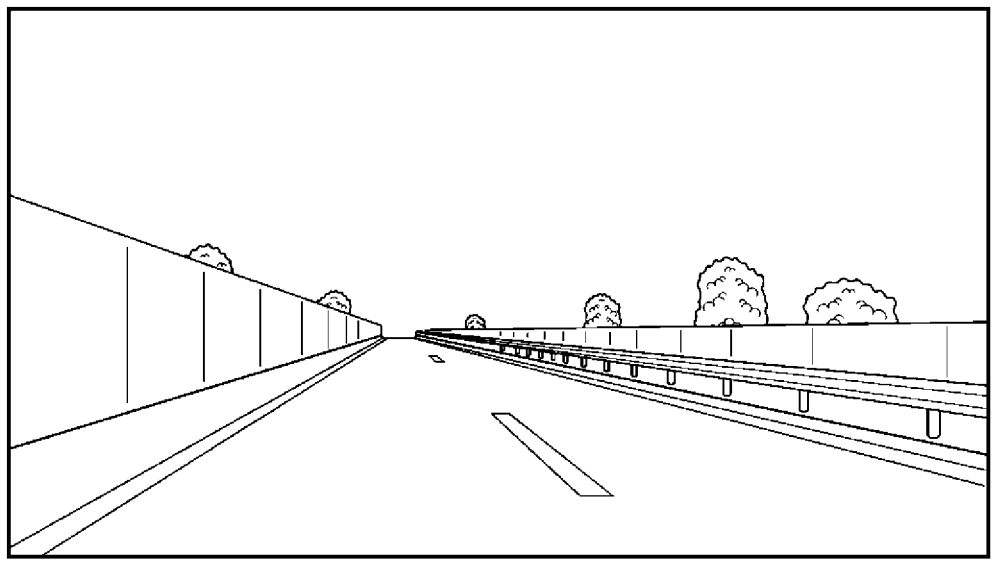
FIG. 2 is a view illustrating an image captured with a vehicle-mounted camera.
Figure 3:
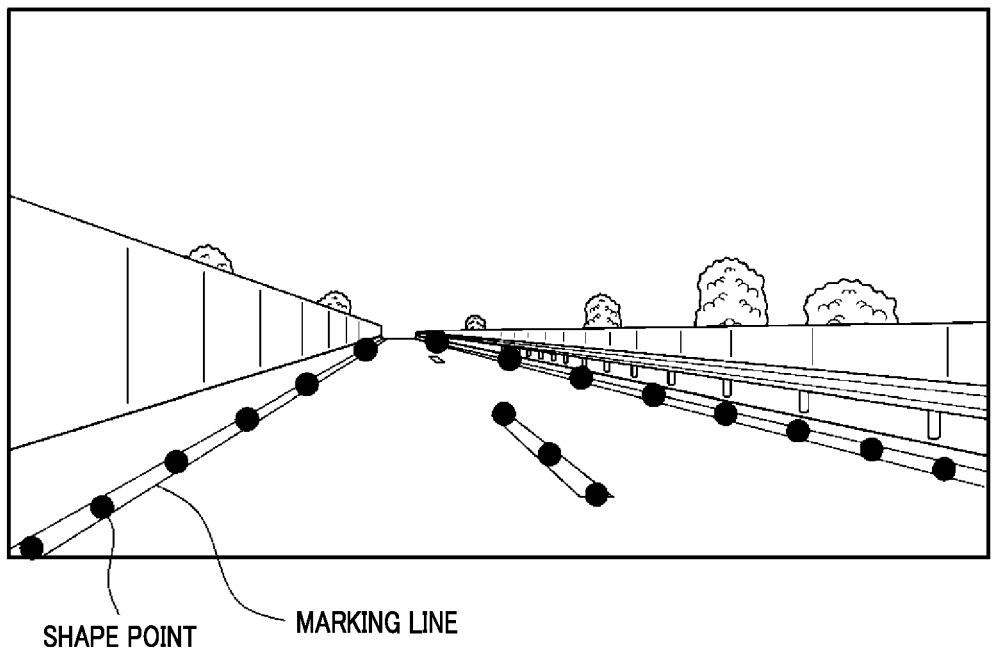
FIG. 3 is a view illustrating image data.

The control unit 4 reads the probe data from the storage device 7, for example, each time a predetermined period has elapsed or each time a travel distance of the vehicle reaches a predetermined distance, and causes the data communication unit 5 to transmit the read probe data to the server 3. In other words, in a case where an image illustrated in FIG. 2 is captured by the vehicle-mounted camera 9, the control unit 4 performs image processing on the image, specifies shape points of marking lines in the image as illustrated in FIG. 3 and causes the data communication unit 5 to transmit image data including the specified shape points to the server 3 as probe data. In this case, as vehicle speed is relatively higher, the interval between shape points becomes relatively longer, and as vehicle speed is relatively slower, the interval between shape points becomes relatively shorter.

The server 3 includes a control unit 10, a data communication unit 11 and a storage device 12 and respective functional blocks can perform data communication with each other via an internal bus 13. The control unit 10 includes a microcomputer including a CPU, a ROM, a RAM and an I/O unit. The microcomputer, which executes a computer program stored in a non-transitory tangible storage medium to thereby execute processing corresponding to the computer program, controls the operation of the server 3. The computer program to be executed by the microcomputer includes a map generation program.

The data communication unit 11 controls data communication with the on-board device 2. The storage device 12 includes a probe data storage unit 12a which stores probe data and a map data storage unit 12b which stores map data. In a case where the data communication unit 11 receives probe data from the on-board device 2, the control unit 10 causes the received probe data to be stored in the probe data storage unit 12a. In other words, the on-board device 2 has a many-to-one relationship with the server 3, and thus, the control unit 10 causes a plurality of pieces of probe data received from a plurality of on-board devices 2 to be stored in the probe data storage unit 12a. Further, in a case where map data which will be described later is generated, the control unit 10 causes the generated map data to be stored in the map data storage unit 12b. The control unit 10 reads the map data stored in the map data storage unit 12b and causes the data communication unit 11 to deliver the read map data to the on-board device 2.

Figure 4:
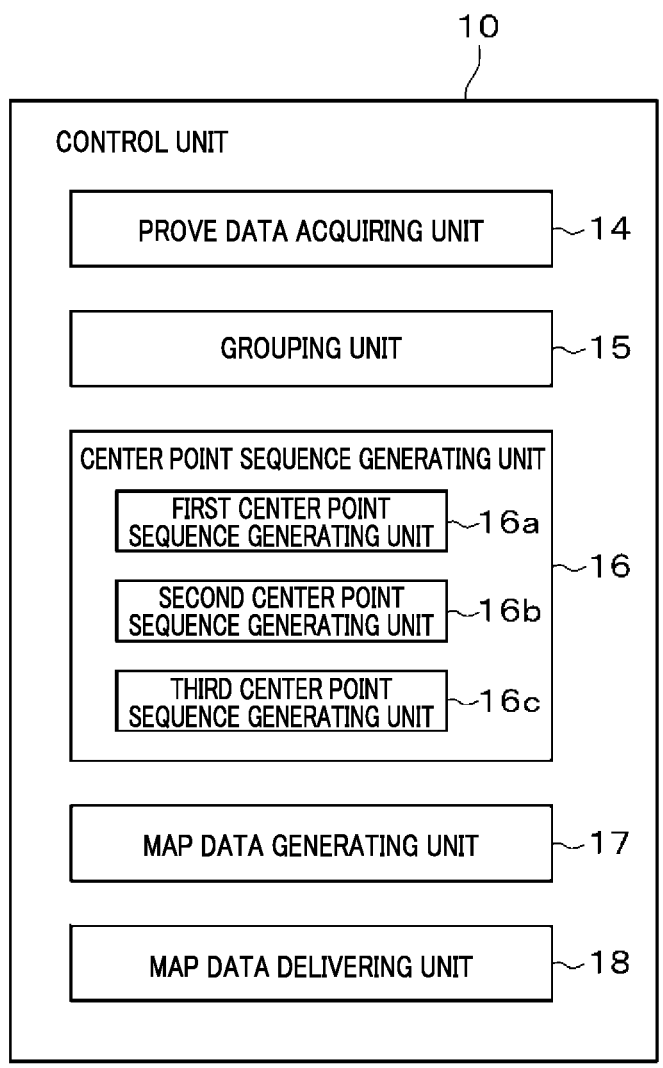
FIG. 4 is a functional block diagram of a control unit of a server.
Figure 5:
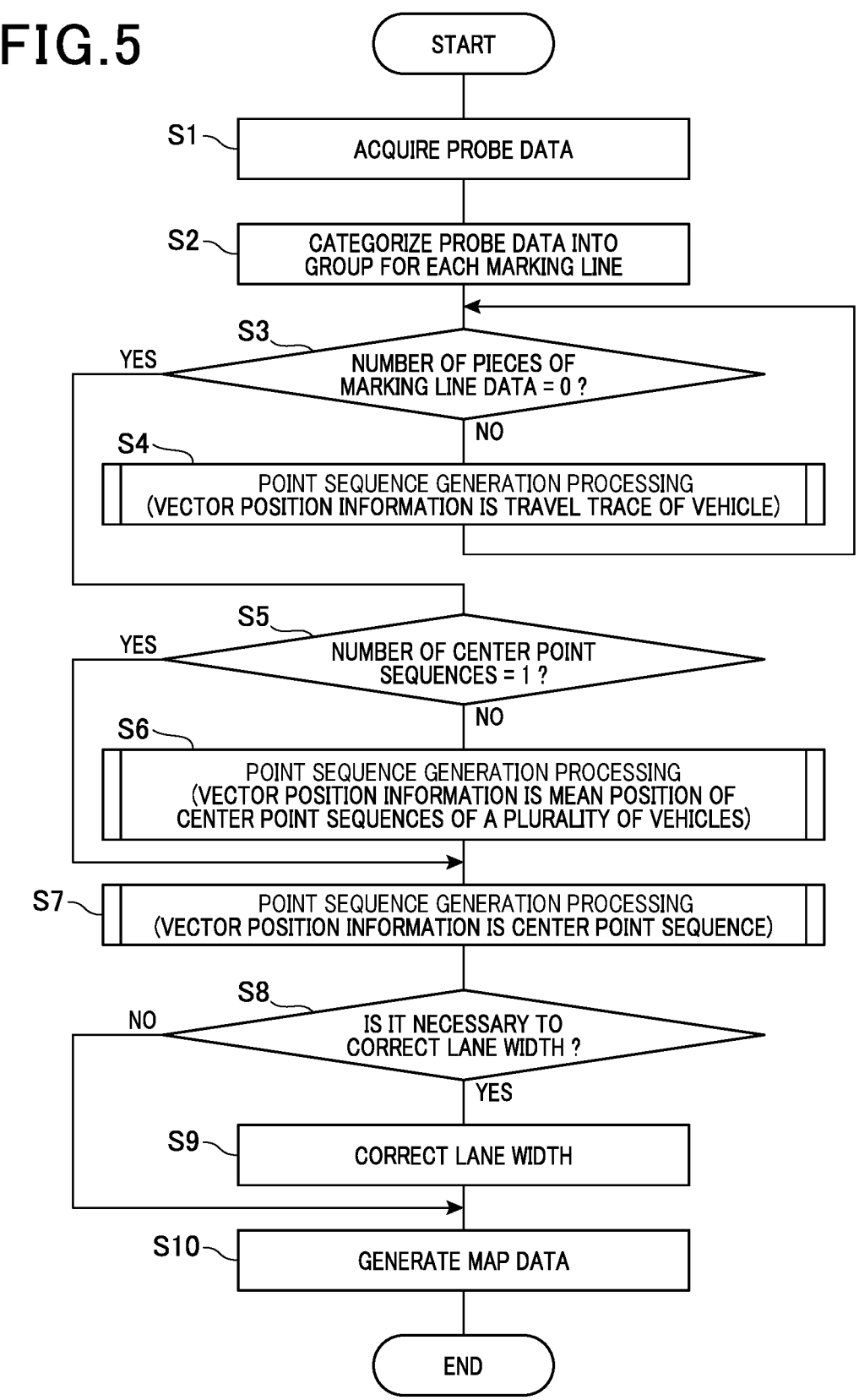
FIG. 5 is a flowchart (No. 1).
Figure 6:
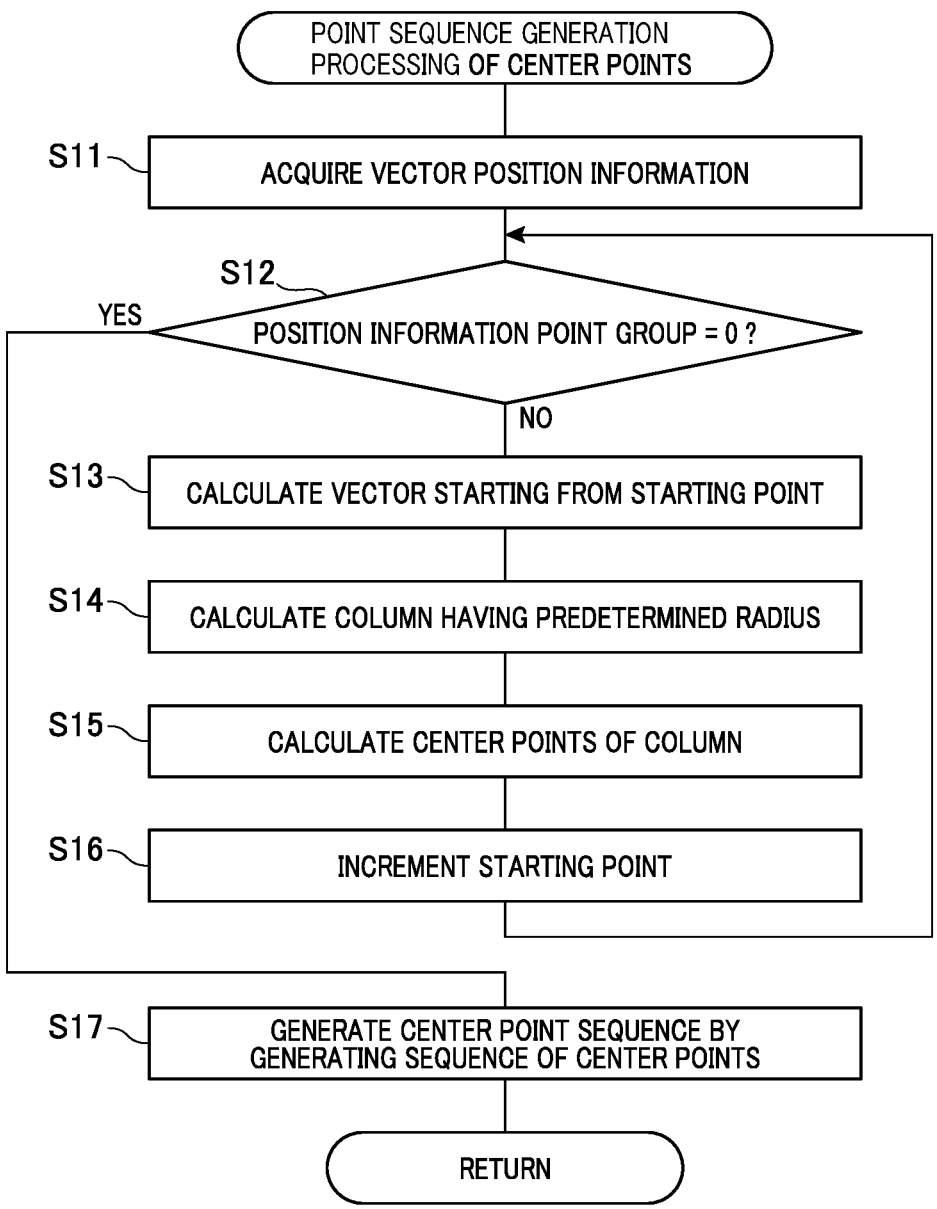
FIG. 6 is a flowchart (No. 2).

As illustrated in FIG. 4, the control unit 10 includes a probe data acquiring unit 14, a grouping unit 15, a center point sequence generating unit 16, a map data generating unit 17, and a map data delivering unit 18. These functional blocks correspond to processing by the map generation program, to be executed by the microcomputer.

The probe data acquiring unit 14 reads and acquires the probe data of each of vehicles traveling on a road stored in the probe data storage unit 12a. In a case where the probe data is acquired by the probe data acquiring unit 14, the grouping unit 15 categorizes the shape point sequences of the marking lines on the road included in the acquired probe data into plural groups for the respective vehicles.

The center point sequence generating unit 16 includes a first center point sequence generating unit 16a, a second center point sequence generating unit 16b, and a third center point sequence generating unit 16c. In a case where the shape point sequences of the marking lines on the road are categorized into plural groups for the respective vehicles by the grouping unit 15, the first center point sequence generating unit 16a has a function of: setting, as a starting point, a selected one of the shape points within the shape point sequence in each group categorized by the grouping unit; setting a predetermined region around the starting point; and calculating a first center point in the predetermined region, and repeatedly performs the function while sequentially shifting the selected one of the shape points as the starting point and the predetermined region to thereby generate a sequence of the first center points as a first center point sequence for the corresponding vehicle in the corresponding group.

In a case where the first center point sequence generation unit 16a generates the first center point sequence for a first vehicle included in the vehicles for one of the marking lines, and generates the first center point sequence for a second vehicle included in the vehicles for the same one of the marking lines, the second center point sequence generating unit 16b has a function of: for example, setting, as a starting point, a selected one of the first center points included in both the first center point sequences of the respective first and second vehicles generated by the first center point sequence generating unit; setting a predetermined region around the starting point; and calculating a second center point in the predetermined region; and repeatedly perform the function while sequentially shifting the selected one of the first center points as the starting point and the predetermined region to thereby generate a sequence of the second center points as a second center point sequence for the same one of the marking lines.

In a case where the second center point sequence is generated by the second center point sequence generating unit 16b, the third center point sequence generating unit 16c has a function of: setting, as a starting point, a selected one of the second center points included in the second center point sequence generated by the second center point sequence generating unit; setting a predetermined region around the starting point; and calculating a third center point in the predetermined region; and repeatedly perform the function while sequentially shifting the selected one of the second center points as the starting point and the predetermined region to thereby generate a sequence of the third center points as a third center point sequence for the same one of the marking lines.

In a case where the third center point sequence is generated by the third center point sequence generating unit 16c, the map data generating unit 17 generates map data by specifying the generated third center point sequence as a corresponding marking line on a map. In a case where the map data is generated by the map data generating unit 17, the map data delivering unit 18 causes the data communication unit 11 to deliver the generated map data to the on-board device 2.

Operation of the above-described configuration will be described next with reference to FIG. 5 to FIG. 11.

In a case where map generation processing is started, the control unit 10 of the server 3 reads and acquires probe data of each of vehicles traveling on a road stored in the probe data storage unit 12a of the storage device 12 (step S1, probe data acquisition step). In a case where the probe data is acquired, the control unit 10 categorizes the acquired probe data into plural groups for each marking line (step S2, grouping step).

Figure 7:
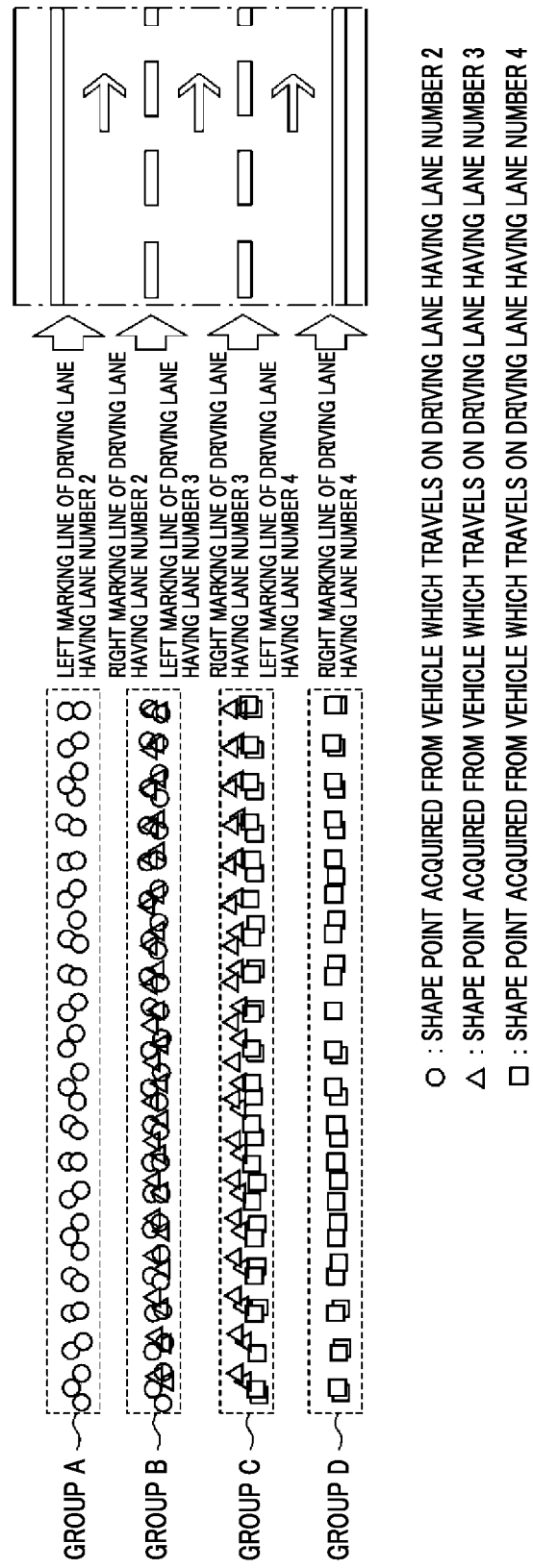
FIG. 7 is a view illustrating a shape point sequence of a marking line.

In other words, for example, in a case where vehicles travel on driving lanes having lane numbers of 2 to 4, the control unit 10 acquires a shape point sequence of probe data acquired from the vehicle which travels on the driving lane having the lane number of 2, a shape point sequence of probe data acquired from the vehicle which travels on the driving lane having the lane number of 3, and a shape point sequence of probe data acquired from the vehicle which travels on the driving lane having the lane number of 4 as illustrated in FIG. 7. The control unit 10 categorizes the probe data into plural groups by categorizing the shape point sequence of a left marking line in a vehicle traveling direction of lane number 2 into group A, categorizing the shape point sequence of a right marking line in the vehicle traveling direction of the lane number of 2 and the shape point sequence of a left marking line in the vehicle traveling direction of lane number 3 into group B, categorizing the shape point sequence of a right marking line in the vehicle traveling direction of lane number 3 and the shape point sequence of a left marking line in the vehicle traveling direction of lane number 4 into group C, and categorizing the shape point sequence of a right marking line in the vehicle traveling direction of lane number 4 into group D. In this case, the number of pieces of marking line data is 1 for group A and group D, while the number of pieces of marking line data is 2 for group B and group C.

In a case where the probe data is categorized into plural groups for each marking line, the control unit 10 determines whether the number of pieces of marking line data for each group is 0 and determines whether there is a shape point sequence for which processing of generating a point sequence from center points has not been executed (step S3). In a case where the control unit 10 determines that the number of pieces of the marking line data is not 0, and determines that there is a point sequence for which processing of generating a point sequence from center points has not been executed (step S3: No), the processing proceeds to processing of generating a point sequence from center points (hereinafter, referred to as first point sequence generation processing) for generating the first center point sequence from the point sequence for which processing of generating a point sequence from the center points has not been executed (step S4, center point sequence generation step).

When starting the first point sequence generation processing, the control unit 10 acquires vector position information (step S11). In this case, the control unit 10 acquires a travel track of the vehicle as the vector position information. The control unit 10 determines whether a position information point group is 0 and determines whether a tip end of a vector has reached a last point of the shape point sequence (step S12).

In a case where the control unit 10 determines that the position information point group is not 0 and determines that the tip end of the vector has not reached the last point of the shape point sequence (step S12: No), the control unit 10 calculate a vector defined from the first point in the shape point sequence as its beginning point (its tail) to the Nth point, such as the fifth point, in the shape point sequence as its end point (its head) in step S13; N represents a predetermined number more than or equal to 2. In this case, the control unit 10 acquires the travel track of the vehicle as the vector position information, and thus, calculates the vector in accordance with the travel track of the vehicle.

In a case where the control unit 10 calculates the vector, the control unit 10 calculates a column (predetermined range) with a predetermined radius centered on the calculated vector (step S14). In this case, the control unit 10 calculates a column while setting the predetermined radius so that shape points largely deviating from other shape points are removed and the remaining shape points are included in the column.

In a case where the control unit 10 calculates a column having a predetermined radius, the control unit 10 calculates a center point of the calculated column (step S15). In a case where the control unit 10 calculates the center point of the column, the processing returns to step S12 while the starting point is incremented (step S16), and the processing from step S12 to S16 is repeatedly performed.

In a case where the control unit 10 determines that the position information point group is 0 and determines that the tip end of the vector has reached the last point of the shape point sequence (step S12: Yes), the control unit 10 generates the center point sequence by generating a point sequence from the center points calculated so far (step S17) and finishes the first point sequence generation processing. In other words, the control unit 10 continues to calculate center points of the column while incrementing the starting point until it is determined that the tip end of the vector has reached the last point of the shape point sequence, and in a case where it is determined that the tip end of the vector has reached the last point of the shape point sequence, generates a center point sequence by generating a point sequence from the center points of the column calculated so far and finishes the first point sequence generation processing. The control unit 10 generates the first center point sequence by performing the first point sequence generation processing in this manner.

The first point sequence generation processing will be described below with reference to FIG. 8 and FIG. 9. In an example of group B illustrated in FIG. 7, in a case where a vehicle A travels on a driving lane having lane number 2, a shape point sequence of a right marking line in a traveling direction of the vehicle a is generated, and in a case where a vehicle B travels on a driving lane having lane number 3, a shape point sequence of a left marking line in a traveling direction of the vehicle b is generated.

Figure 8:
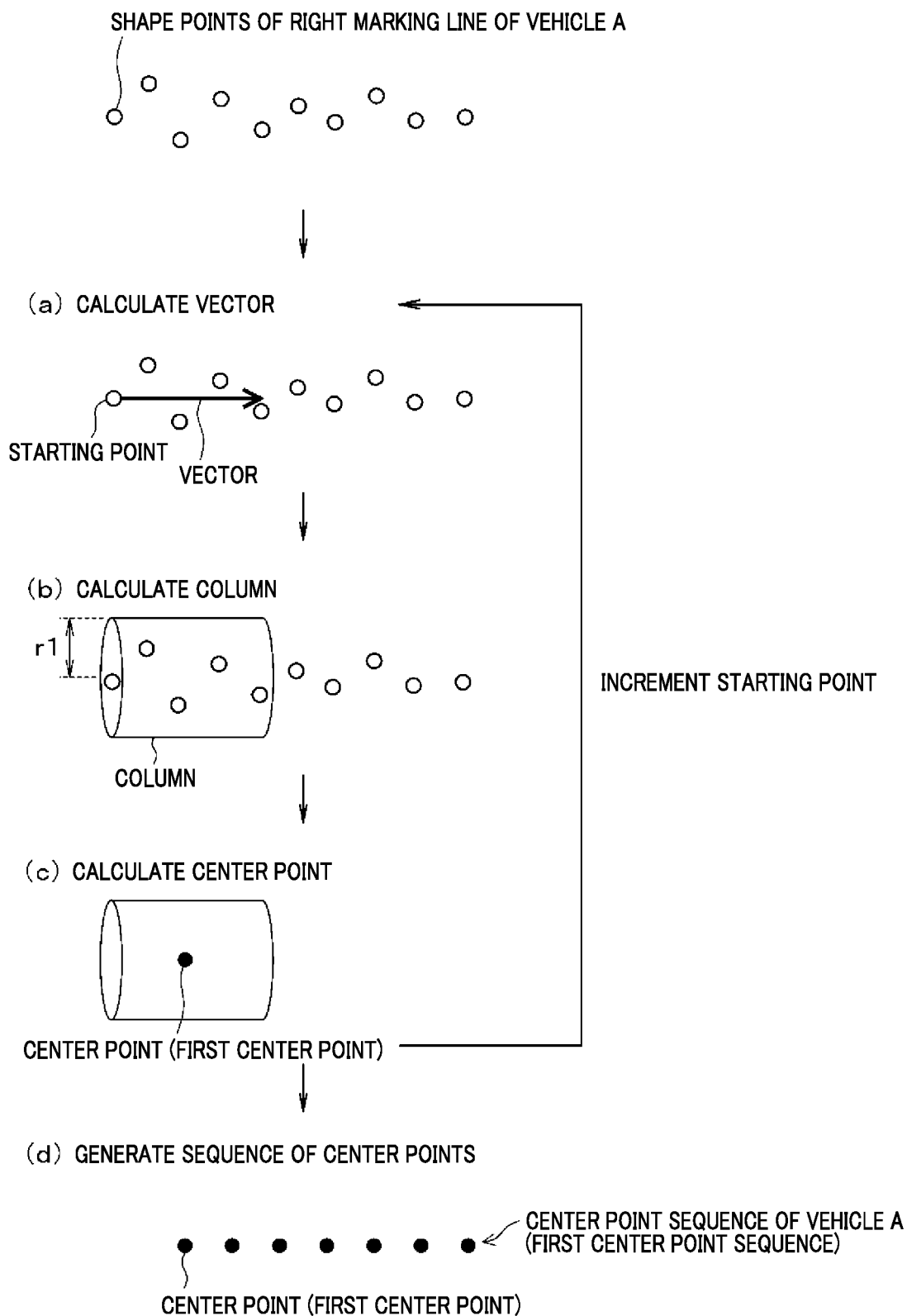
FIG. 8 is a view (No. 1) illustrating an aspect of generating a first center point sequence.
Figure 9:
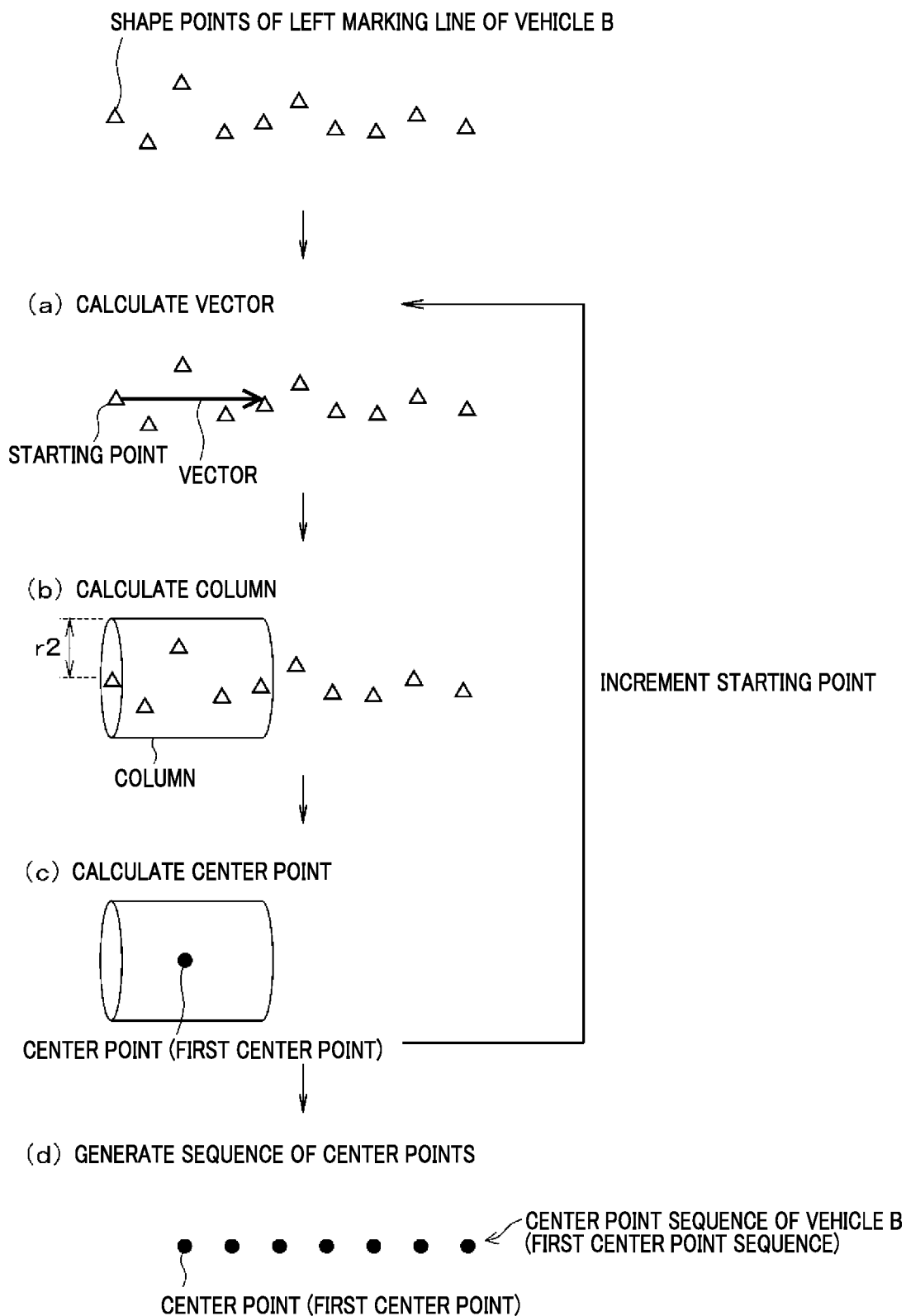
FIG. 9 is a view (No. 1) illustrating an aspect of generating a first center point sequence.

As illustrated in FIG. 8, the control unit 10 generates a first center point sequence of the vehicle a by extracting the shape point sequence of the right marking line in the traveling direction of the vehicle A generated by the vehicle A traveling on the driving lane having lane number 2 and performing the first point sequence generation processing on the extracted shape point sequence. In this case, variation of the first center points of the vehicle A generated by the first point sequence generation processing is smaller than variation of shape points of the right marking line in the traveling direction of the vehicle A, and thus, the first center point sequence of the vehicle A has higher linearity than the shape point sequence of the right marking line in the traveling direction of the vehicle A. Further, as illustrated in FIG. 9, the control unit 10 generates a first center point sequence of the vehicle B by extracting the shape point sequence of the left marking line in the traveling direction of the vehicle B generated by the vehicle B traveling on the driving lane having lane number 3 and performing the first point sequence generation processing on the extracted shape point sequence. In this case, variation of the first center points of the vehicle B generated by the first point sequence generation processing is smaller than variation of shape points of the left marking line in the traveling direction of the vehicle B, and thus, the first center point sequence of the vehicle B has higher linearity than the shape point sequence of the left marking line in the traveling direction of the vehicle B.

In a case where the control unit 10 finishes the first point sequence generation processing, the control unit 10 determines whether the number of center point sequences is 1 and determines whether center point sequences from a plurality of vehicles exist for the same marking line (step S5). In a case where the control unit 10 determines that the number of center point sequences is not 1 (equal to or larger than 2) and determines that center point sequences from a plurality of vehicles exist for the same marking line (step S5: No), the processing transitions to processing of generating a point sequence from center points (hereinafter, referred to as second point sequence generation processing) for generating a second center point sequence from the first center point sequence (step S6). Note that in a case where the control unit 10 determines that the number of center point sequences is 1 and determines that center point sequences from a plurality of vehicles do not exist for the same marking line (step S5: Yes), the processing transitions to processing of generating a point sequence from center points (hereinafter, referred to as third point sequence generation processing) for generating a third center point sequence from the first center point sequence which will be described later (step S7) without transitioning to the second point sequence generation processing. In other words, while the processing of the control unit 10 transitions to the second point sequence generation processing for group B and group C illustrated in FIG. 7 because the number of pieces of marking line data is 2, the processing of the control unit 10 does not transition to the second point sequence generation processing for group A and group D because the number of pieces of marking line data is 1.

In a case where the second point sequence generation processing is started, the control unit 10 acquires vector position information (step S11). In this case, the control unit 10 acquires a mean position of the first center point sequences of a plurality of vehicles as the vector position information and performs the above-described processing from step S12 to S17.

Figure 10:
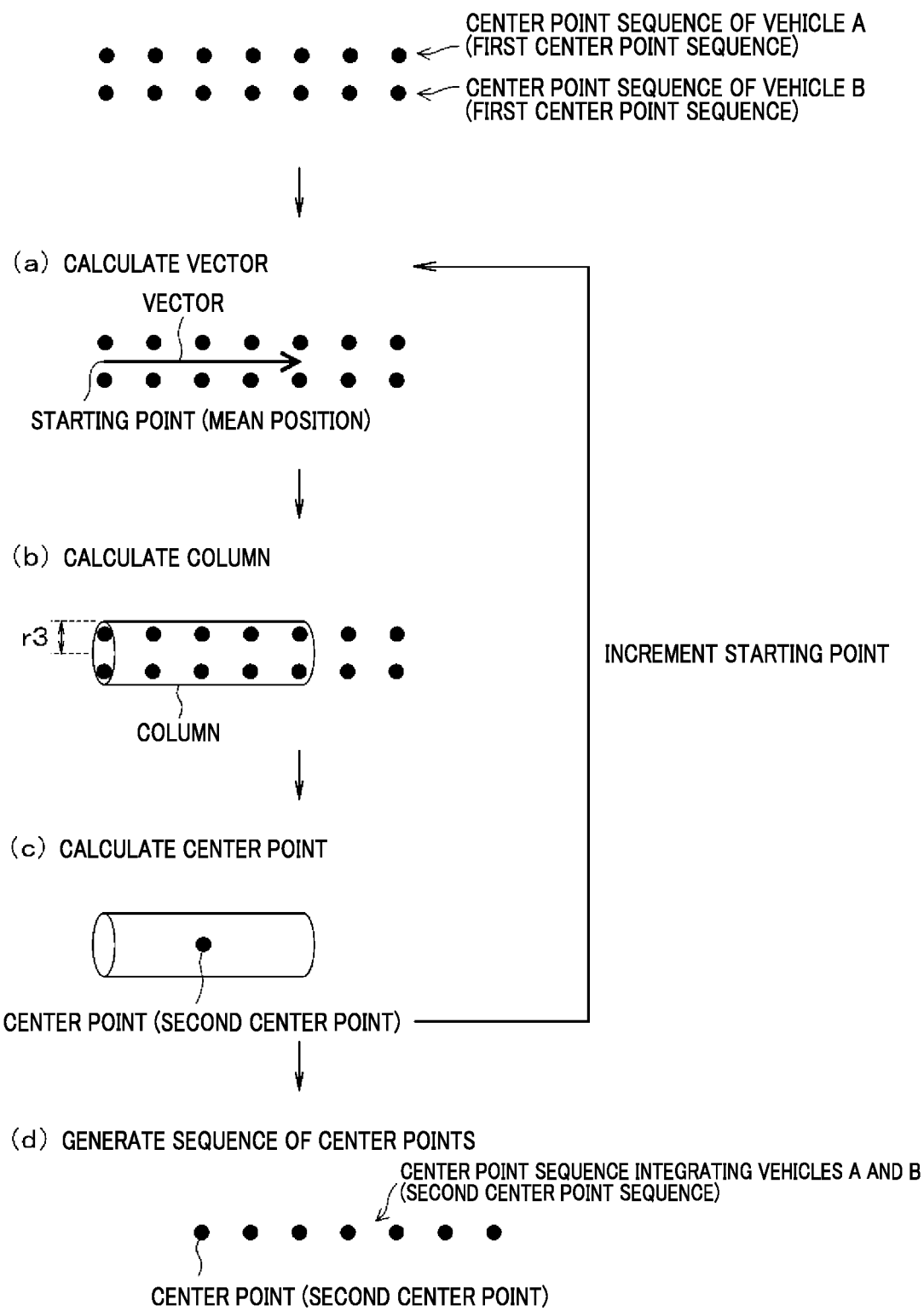
FIG. 10 is a view illustrating an aspect of generating a second center point sequence.

The second point sequence generation processing will be described below with reference to FIG. 10. In an example of group B illustrated in FIG. 7, the control unit 10 generates two first center point sequences from the vehicles A and B as described above. As illustrated in FIG. 10, the control unit 10 generates the second center point sequence integrating the vehicles A and B by performing the second point sequence generation processing on the two first center point sequences from the vehicles A and B. Note that variation of the first center points becomes smaller than variation of the shape points as a result of the control unit 10 performing the first point sequence generation processing, and thus, a radius (r3 in FIG. 10) of the column calculated in the second point sequence generation processing becomes smaller than a radius (r1 in FIG. 8 and r2 in FIG. 9) of the column calculated in the first point sequence generation processing. Further, while a case has been described where two first center point sequences are generated in group B illustrated in FIG. 7, in a case where three or more first center point sequences are generated, a mean position of the three or more first center point sequences is acquired as the vector position information. Further, the vector position information is not limited to the mean position of a plurality of first center point sequences, and one of the plurality of first center point sequences which is selected as a representative of the plurality of first center point sequences may be acquired as the vector position information. The control unit 10 generates the second center point sequence by performing the second point sequence generation processing in this manner.

In a case where the control unit 10 finishes the second point sequence generation processing, the processing transitions to the third point sequence generation processing (step S7). In a case where the control unit 10 starts the third point sequence generation processing, the control unit 10 acquires the vector position information (step S11). In this case, the control unit 10 acquires the second center point sequence as the vector position information in a case where the second point sequence generation processing is performed, acquires the first center point sequence as the vector position information in a case where the second point sequence generation processing is not performed, and performs the above-described processing from step S12 to S17.

Figure 11:
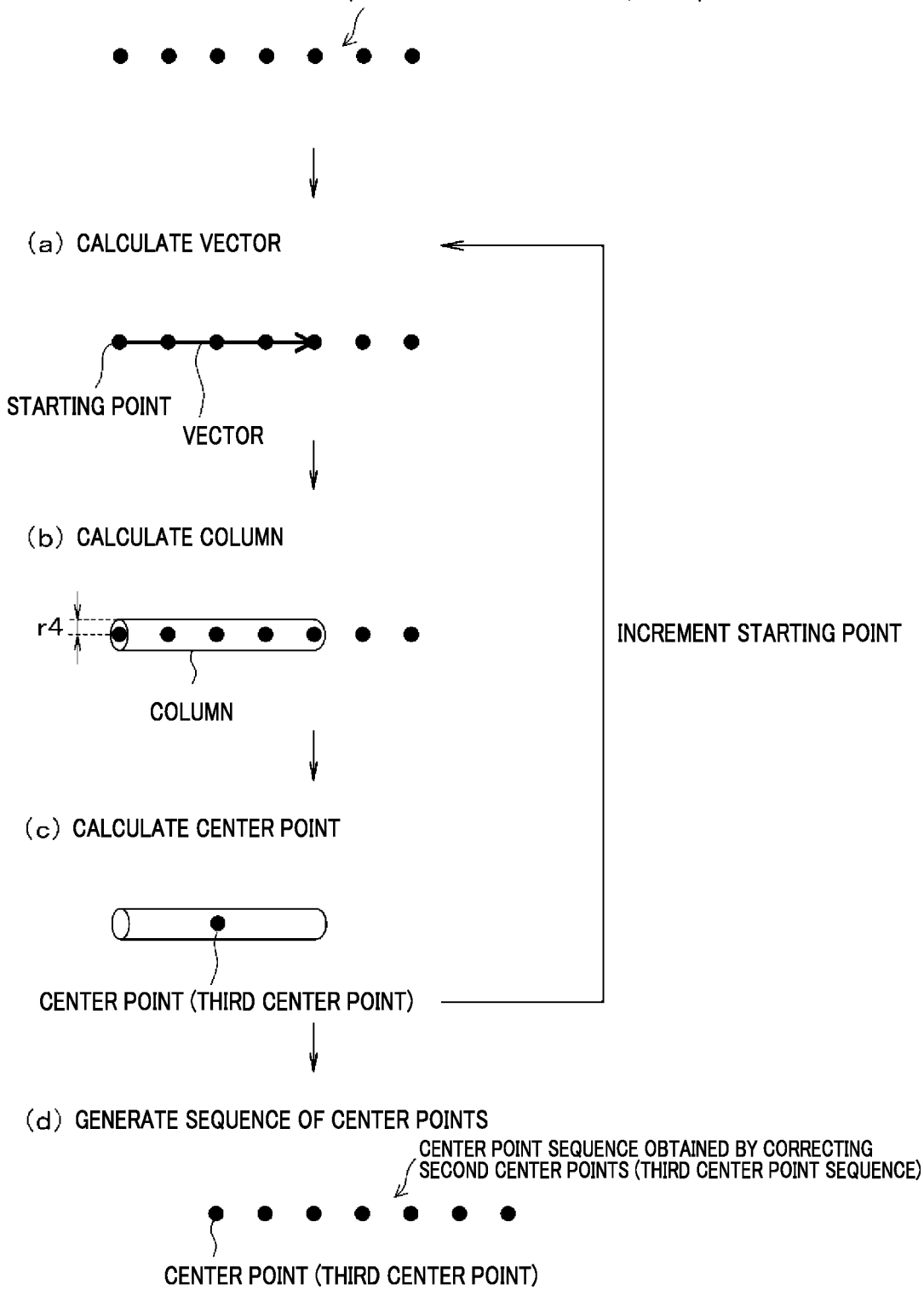
FIG. 11 is a view illustrating an aspect of generating a third center point sequence.

The third point sequence generation processing will be described below with reference to FIG. 11. In an example of group B illustrated in FIG. 7, the control unit 10 has generated the second center point sequence based on the first center point sequence of the vehicle A and the second center point sequence of the vehicle B as described above. As illustrated in FIG. 11, the control unit 10 performs the third point sequence generation processing, i.e. the operations in steps S12 to S17, on the second center point sequence generated based on the first center point sequence of the vehicle A and the second center point sequence of the vehicle B to thereby correct the second center point sequence to a third center point sequence. Note that as a result of the control unit 10 performing the second point sequence generation processing, variation of the second center points becomes smaller than variation of the first center points, and thus, a radius (r4 in FIG. 11) of the column calculated in the third point sequence generation processing becomes smaller than a radius (r3 in FIG. 10) of the column calculated in the second point sequence generation processing. The control unit 10 generates the third center point sequence by performing the third point sequence generation processing in this manner. The control unit 10 then reduces variation of the first center points, variation of the second center points and variation of the third center points in a stepwise manner and increases linearity of the first center point sequence, the second center point sequence and the third center point sequence in a stepwise manner, by performing the first point sequence generation processing, the second point sequence generation processing and the third point sequence generation processing in a stepwise manner.

In a case where the control unit 10 generates the third center point sequence in this manner, the control unit 10 specifies the third center point sequence as a marking line on a map and determines whether it is necessary to correct the lane width (step S8). In other words, it is stipulated in the traffic regulations that an interval between adjacent marking lines of a driving lane is from 3.5 meters to 3.75 meters. In a case where an interval between adjacent third center point sequences deviates from a range between 3.5 meters and 3.75 meters, the control unit 10 determines that it is necessary to correct the lane width (step S8: Yes) and corrects the lane width by correcting a position of the third center point sequence so that the interval falls within the range (step S9). In a case where the interval between adjacent third center point sequences do not deviate from the range between 3.5 meters and 3.75 meters, the control unit 10 determines that it is not necessary to correct the lane width (step S8: No) and does not correct the position of the third center point sequence.

In a case where the control unit 10 specifies the third center point sequence as a marking line on the map in this manner, the control unit 10 generates map data (S10, map data generation step) and finishes the map generation processing. Thereafter, the control unit 10 causes the map data generated in this manner to be stored in the map data storage unit 12b of the storage device 12. Further, the control unit 10 reads the map data stored in the map data storage unit 12b and causes the data communication unit 11 to deliver the read map data to the on-board device 2. Note that any condition may be employed as a condition for the control unit 10 to cause the map data to be delivered, and, for example, in a case where a delivery request of the map data is received, the map data may be delivered to the on-board device 2 which has transmitted the delivery request of the map data, or the map data may be regularly delivered to an unspecified number of on-board devices 2.

According to the present embodiment as described above, it is possible to provide the following operational effects.

At the server 3, the shape point sequences of the marking lines on the road included in the probe data is categorized into plural groups for the respective vehicles, a center point sequence is generated for each marking line to thereby remove, from the shape point sequences of the marking lines, information which is dependent on traveling states of the vehicles, and the center point sequence for each marking line is identified as a corresponding marking line on a map to thereby generate map data. By removing information which is dependent on a traveling states of the vehicles during a process of generating a center point sequence for each marking line, it is possible to generate map data after removing the information which is dependent on the traveling states of the vehicles. This enables appropriate generation of a map with high accuracy which is not dependent on a traveling state of a vehicle.

Further, the map data generated in this manner is delivered to the on-board device 2 from the server 3. By delivering the map data to the on-board device 2, the on-board device 2 can appropriately control the vehicle using the map data with high accuracy which is delivered from the server 3.

While the present disclosure has been described with reference to the examples, it is understood that the present disclosure is not limited to the examples and structures. The present disclosure incorporates various modified examples and modifications within an equivalent range. In addition, various combinations, forms, and other combinations and forms including only one element or more or less elements fall within the scope and the scope of mind of the present disclosure.

While an example has been described where the fifth position information point from the first position information point is set as an end point in a case where a vector is calculated in processing of generating a point sequence from center points, a position information point other than the fifth position information point may be set as the end point. In other words, it is only necessary to determine the number of points from a starting point to the end point upon calculation of a vector in accordance with processing performance of the server 3, accuracy required in the system, or the like. Further, the number of points from the starting point to the end point upon calculation of a vector may be the same or different among the first point sequence generation processing, the second point sequence generation processing and the third point sequence generation processing.

The control unit and the method described in the present disclosure may be implemented by a dedicated computer including a processor which is programmed to execute one or more functions embodied by a computer program, and a memory. Alternatively, the control unit and the method described in the present disclosure may be implemented by a dedicated computer including a processer constituted with one or more dedicated hardware logic circuits. Alternatively, the control unit and the method described in the present disclosure may be implemented by one or more dedicated computers constituted with combination of a processor which is programmed to execute one or more functions and a memory, and a processor constituted with one or more hardware logic circuits. Further, the computer program may be stored in a computer-readable non-transitory tangible recording medium as instructions to be executed by the computer.

What is claimed is:

1. A map generation device comprising:
    a probe data acquiring unit configured to acquire a probe data from each vehicle of a plurality of vehicles traveling on a road, the probe data generated based on image data captured by a camera mounted to the corresponding vehicle, the probe data comprising, as shape point sequences, sequences of shape points that indicate marking lines on the road;
    a grouping unit configured to categorize the shape point sequences into a plurality of groups for each of the respective plurality of vehicles, each of the plurality cgroups including one or more shape point sequences of marking lines on the road that are acquired by the respective vehicle;
    a center point sequence generating unit configured to generate a center point sequence for each marking line based on the one or more shape point sequences included in each of the plurality of groups, wherein generating the center point sequence for each marking line removes information dependent on traveling states of the plurality of vehicles from the shape point sequences of the marking lines; and
    a map data generating unit configured to identify the center point sequence for each marking line as a corresponding marking line on a map, and generate map data of the corresponding marking line on the map using the center point sequence, wherein
    the map data is delivered to a vehicle, and
    the vehicle is controlled using the map data.

2. The map generation device according to claim 1, wherein the center point sequence generating unit comprises a first center point sequence generating unit configured to:
    have a first function of:

setting, as a first starting point, a selected one of the shape points within the shape point sequence in each group categorized by the grouping unit;

setting a predetermined first region around the first starting point; and calculating a first center point in the predetermined first region; and repeatedly perform the first function while sequentially shifting the selected one of the shape points as the first starting point and the predetermined first region to thereby generate a sequence of the first center points as a first center point sequence for the corresponding vehicle in the corresponding group.

3. The map generation device according to claim 2, wherein, in a case where the first center point sequence generation unit generates the first center point sequence for a first vehicle included in the plurality of vehicles for one of the marking lines, and generates the first center point sequence for a second vehicle included in the plurality of vehicles for the same one of the marking lines, the center point sequence generating unit comprises a second center point sequence generating unit configured to:

have a second function of:

setting, as a second starting point, a selected one of the first center points included in both the first center point sequences of the respective first and second vehicles generated by the first center point sequence generating unit;

setting a predetermined second region around the second starting point; and calculating a second center point in the predetermined second region; and repeatedly perform the second function while sequentially shifting the selected one of the first center points as the second starting point and the predetermined second region to thereby generate a sequence of the second center points as a second center point sequence for the same one of the marking lines.

4. The map generation device according to claim 3, wherein the center point sequence generating unit comprises a third center point sequence generating unit configured to:

have a third function of:

setting, as a third starting point, a selected one of the second center points included in the second center point sequence generated by the second center point sequence generating unit;

setting a predetermined third region around the third starting point; and calculating a third center point in the predetermined third region; and repeatedly perform the third function while sequentially shifting the selected one of the second center points as the third starting point and the predetermined third region to thereby generate a sequence of the third center points as a third center point sequence for the same one of the marking lines.

5. The map generation device according to claim 1, further comprising:

a map data delivering unit configured to deliver the map data generated by the map data generating unit.

6. A non-transitory computer-readable storage medium storing a set of computer program instructions, the instructions causing a map generation processor to:

acquire a probe data from each vehicle of a plurality of vehicles traveling on a road, the probe data generated based on image data captured by a camera mounted to the corresponding vehicle, the probe data comprising, as shape point sequences, sequences of shape points that indicate marking lines on the road;

categorize the shape point sequences into a plurality of groups for each of the respective plurality of vehicles, each of the plurality of groups including one or more shape point sequences of marking lines on the road that are acquired by the respective vehicle;

generate a center point sequence for each marking line based on the one or more shape point sequences included in each of the plurality of groups, wherein generating the center point sequence for each marking line to thereby remove, from the shape point sequences of the removes information dependent on traveling states of the plurality of vehicles from the shape point sequences of the marking lines; and identify the center point sequence for each marking line as a corresponding marking line on a map, and generate map data of the corresponding marking line on the map using the center point sequence, wherein the map data is delivered to a vehicle, and the vehicle is controlled using the map data.

7. A map generation method of generating a map, the method comprising:

acquiring a probe data from each vehicle of a plurality of vehicles traveling on a road, the probe data generated based on image data captured by a camera mounted to the corresponding vehicle, the probe data comprising, as shape point sequences, sequences of shape points that indicate marking lines on the road;

categorizing the shape point sequences into a plurality of groups for each of the respective plurality of vehicles, each of the plurality of groups including one or more shape point sequences of marking lines on the road that are acquired by the respective vehicle;

generating a center point sequence for each marking line based on the one or more shape point sequences included in each of the plurality of groups, wherein generating the center point sequence for each marking line removes information dependent on traveling states of the plurality of vehicles from the shape point sequences of the marking lines; and identifying the center point sequence for each marking line as a corresponding marking line on a map, and generate map data of the corresponding marking line on the map using the center point sequence, wherein the map data is delivered to a vehicle, and the vehicle is controlled using the map data.

* * * * *